United States Patent [19]

Kosonen

[11] Patent Number: 4,581,139

[45] Date of Patent: Apr. 8, 1986

[54] FILTRATE RUN-BACK BAFFLE FOR ROTARY DRUM VACUUM FILTER

[75] Inventor: Vaino J. Kosonen, West Redding, Conn.

[73] Assignee: Dorr-Oliver Incorporated, Stamford, Conn.

[21] Appl. No.: 675,802

[22] Filed: Nov. 28, 1984

Related U.S. Application Data

[63] Continuation of Ser. No. 539,467, Oct. 6, 1983, abandoned.

[51] Int. Cl.$^4$ ............................................. B01D 33/06
[52] U.S. Cl. .................................... 210/232; 210/404; 210/406; 162/335
[58] Field of Search ................ 162/335; 210/402, 404, 210/406, 232

[56] References Cited

U.S. PATENT DOCUMENTS

| | | | |
|---|---|---|---|
| 3,323,654 | 6/1967 | Lee | 210/404 |
| 3,962,091 | 6/1976 | Doria et al. | 210/402 X |
| 4,370,231 | 1/1983 | LaValley | 210/404 |

Primary Examiner—Richard V. Fisher
Assistant Examiner—W. Gary Jones
Attorney, Agent, or Firm—Burtsell J. Kearns; Gary R. Plotecher; Larry W. Evans

[57] ABSTRACT

A removable baffle insert for positioning in a filtrate compartment of a rotary drum vacuum filter comprising an elongated C-shaped member positioned between a pair of compartment walls and having one arm thereof providing the ceiling of the compartment to prevent filtrate run-back during the filtration cycle.

1 Claim, 4 Drawing Figures

FILTRATE RUN-BACK BAFFLE FOR ROTARY DRUM VACUUM FILTER

This is a continuation of application Ser. No. 539,467, filed Oct. 6, 1983 now abandoned.

BACKGROUND OF THE INVENTION

The present invention is directed to new and useful improvements in rotary vacuum drum filters and more particularly to filtrate drainage compartments for such filters.

Rotary drum vacuum filters are well known and are used for many industrial processes, for example, in the pulp and paper industry to filter and wash pulp slurries. These filters comprise a cylindrical drum mounted for rotation in a tank containing a slurry solution. A filter media is provided about the drum and filtrate is drawn into filtrate compartments beneath the filter media when vacuum is applied thereto from within the drum.

In one such type filter the drum has a wire wound deck which provides a support for the filter media which may, for example, be a wire mesh or permeable cloth material. The deck wire is wound tightly about the drum across a plurality of spaced and parallel longitudinal ribs or divider strips which are spaced equally distant one from the other along the periphery of the cylindrical drum. The areas between each pair of adjacent dividers constitute longitudinally extending filtrate drainage compartments.

When the drum is rotated through a filtration cycle a vacuum is maintained inside the drum as the drum ascends from the tank. A filter cake is thereby formed on the surface of the filter media and filtrate is drawn into the filtrate compartments by the vacuum and fed to an appropriate discharge opening in the drum. As the drum descends into the tank the vacuum is interrupted by appropriate valve means and the filter cake is removed from the surface of the filter media by a suitable doctoring means.

A problem is encountered in filters of this general type in the processing of certain slurries in providing means to prevent rewetting of the dried filter cake on the filter media from a runback of the filtrate from the filtrate compartments to the cake as the drum rotates in the descending path into the tank when the vacuum to the filtrate compartments is interrupted.

It is an object of the present invention to provide novel means for containing the filtrate in the filtrate compartments of a rotary vacuum drum filter.

Another object is to provide novel means for retrofitting existing filters with filtrate runback prevention means.

Still another object is to provide a simple and effective replaceable baffle means for preventing run-back of filtrate in the filter cake in the filtration cycle of a drum filter.

SUMMARY OF THE INVENTION

The present invention contemplates novel filtrate runback prevention means for a rotary vacuum drum filter. In one embodiment a plurality of longitudinally extending divider members are located about the periphery of the filter drum. A wire deck assembly is wound about the dividers and provided with a filter media on the outer surface thereof. Filtrate channels or compartments are provided between the divider strips beneath the filter media for receiving and leading the filtrate under vacuum to a discharge opening in the drum. Means are provided for preventing runback of filtrate from the compartment upon interruption of the applied vacuum to the filter cake and which means include an elongated C-shaped baffle member inserted into a filtrate channel between a pair of dividers. The insert member has a first arm portion engaged against the surface of the drum and the other arm beneath the filter media to contain filtrate in the compartment in the descending path of the filter drum.

The above and other objects and advantages of the present invention will appeal more fully hereinafter from a consideration of the detailed description which follow taken together with the accompanying drawing wherein one embodiment is illustrated.

DETAILED DESCRIPTION

Figure 1:
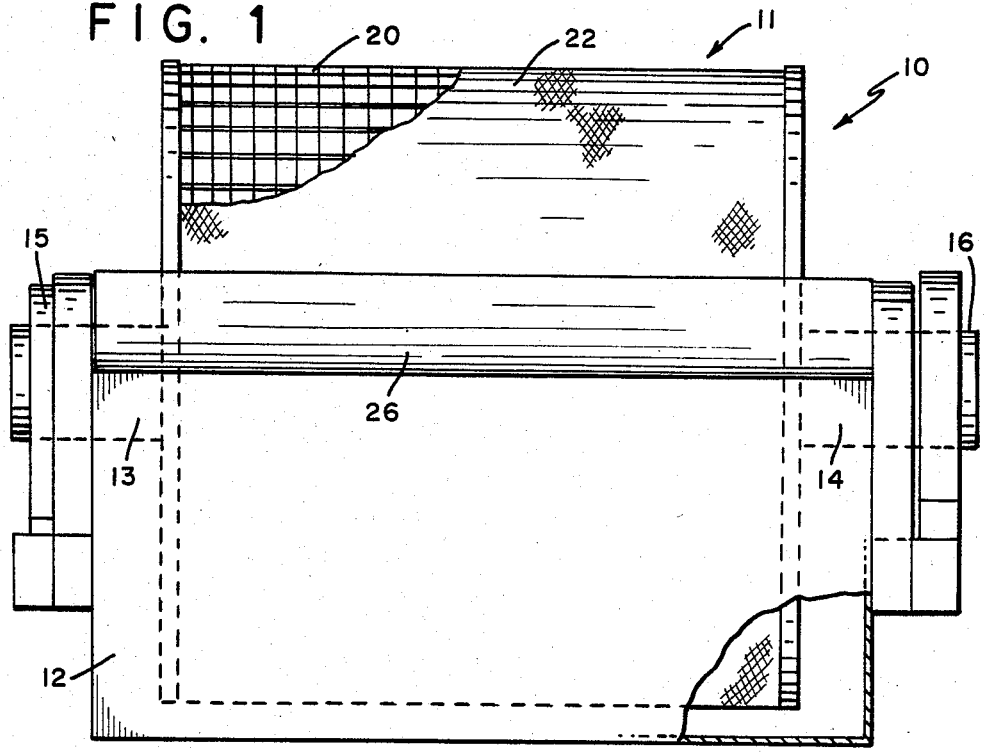
FIG. 1 is a semi-diagrammatic elevational view of a rotary vacuum drum filter incorporating one embodiment of the present invention with parts thereof broken away to disclose the interior thereof.
Figure 2:
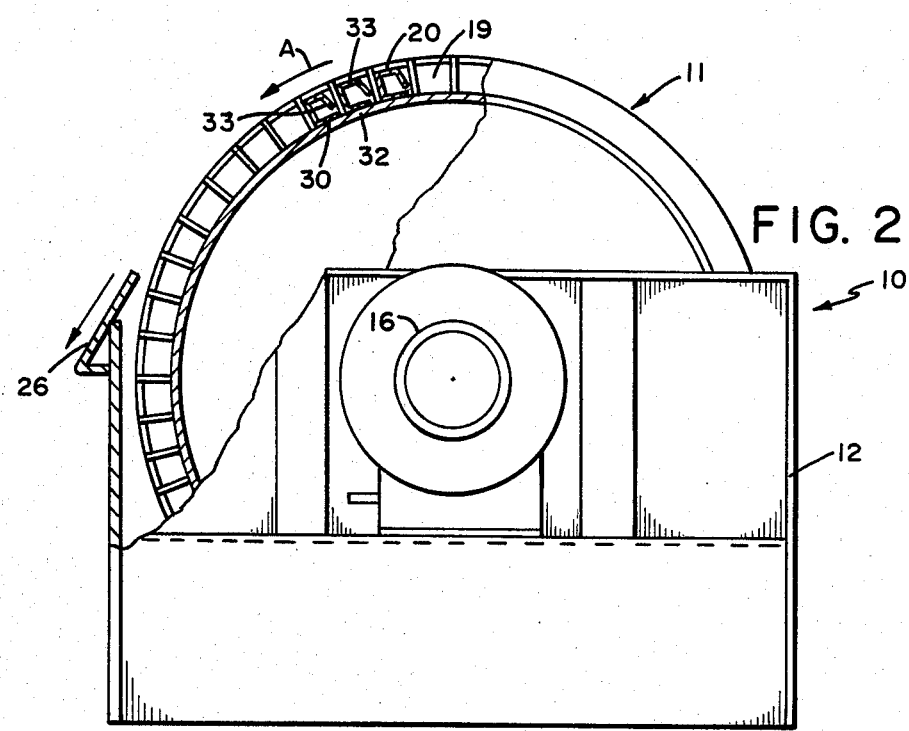
FIG. 2 is a side elevational view partly in cross-section of the filter of FIG. 1.

Referring now to the drawings for a more detailed description of the present invention a rotary vacuum drum filter which comprises a pulp washer unit incorporating an embodiment of the present invention is generally indicated by the reference numeral 10 in FIGS. 1 and 2. Filter 10 is of a generally known structure such as that disclosed in U.S. Pat. No. 3,962,091. Filter 10 includes a drum 11 mounted for rotation in a tank 12 by means of end trunnions 13 and 14 supported in respective bearing housings 15 and 16 provided in the opposite end walls of tank 12.

Drum 11 comprises a cylindrical body provided with longitudinal ribs or divider strips 18 which extend outwardly from end to end of drum 11 and constitute between each adjacent pair of dividers 18 a filtrate drainage channel or compartment 19 for the filtrate liquid. A wire deck is formed by a deck wire 20 wound about dividers 18 in a usual manner with narrowly spaced openings between the wire strands to permit flow of filtrate into compartment 19.

A filter media such as a filter cloth 22 is provided about deck wire 20. Drainage pipes (not shown) are located within drum 11 having connections to filtrate compartments 19 and extend in a well known manner to a valve means located in bearing housings 15 or 16 through which the filtrate is discharged from filter 10 in a usual manner such as disclosed in the mentioned patent.

Figure 3:
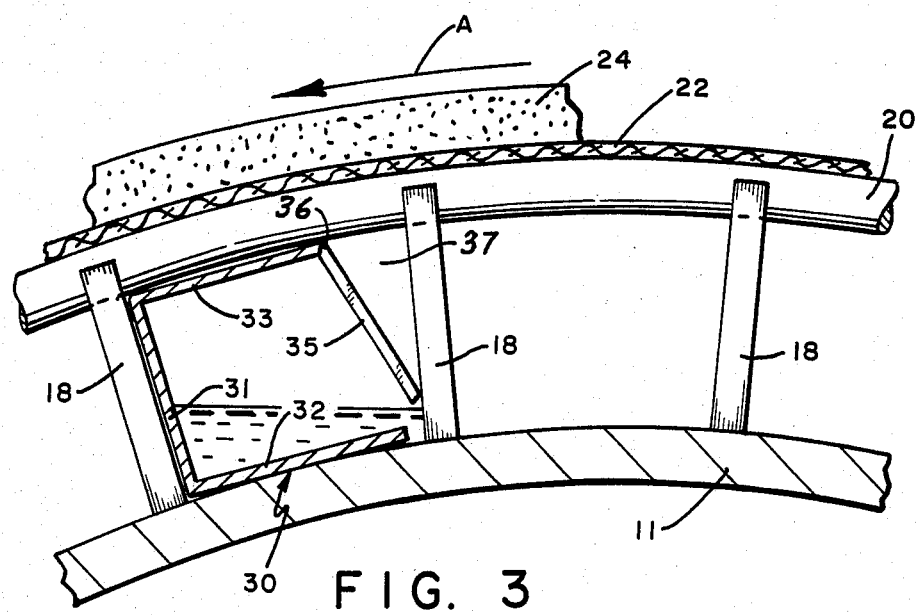
FIG. 3 is an enlarged sectional end view of end portion of the filter media and associated filtrate compartment.
Figure 4:
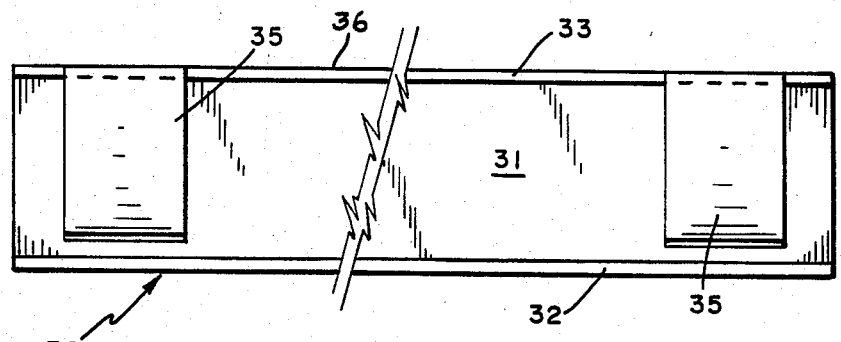
FIG. 4 is a fragmentary rear elevational view of a runback baffle insert removed from its filtrate compartment.

In operation of filter 10 a liquid pulp slurry is fed to tank 12 and drum 11 is rotated in direction of arrow A (FIGS. 2 and 3). A vacuum is applied to the filtrate compartment 19 to effect a suction through filter cloth 22 as drum 11 ascends from tank 12 whereby filter cake 24 adheres to the surface of filter cloth 22. As drum 11 rotates in a descending path into tank 11 a valve assembly is operated in a well known manner to interrupt the vacuum to filtrate compartment 19 to permit removal of the dried filter cake from filter cloth 22 by a doctoring device 26.

In certain filtration processes problems are encountered in the downward path of rotation of drum 11 in that the filtrate in the filtrate compartment 19 will escape or runback from the filtrate compartments 19 to rewet the undersurface of the filter cake 24. As mentioned it is feature of the present invention to provide novel means to aid in preventing the rewetting of the filter cake. To this end baffle insert members 30 are provided for insertion into each filtrate compartment 19 from the end of the filter drum.

Baffle insert member 30 comprises an elongated generally C-shaped metal member which is readily slidable into and out of a filtrate compartment 19. In inserted position the base or bight portion 31 is adapted to lie against the wall surface of a divider 18 (FIG. 3). The spaced upper and lower arms 32 and 33 of insert member 30 respectfully engage the surface of drum 11 and the undersurface of wire deck 20. Arm 33 provides a ceiling to compartment 19 and spaced detent tabs 35 extend from the edge 36 thereof to engage the opposite divider 18 to frictionally maintain baffle 30 in position in filtrate channel 19. Edge 36 is spaced from the divider to provide a longitudinal opening 37 to compartment 19 from filter media 22.

In operation of filter 10 with a baffle 30 inserted into a compartment 19 when drum 11 is rotated in the direction of arrow A (FIG. 3) and vacuum is applied to filtrate compartment 19 filtrate is drawn into compartment 19 through opening 37. As the filtration cycle continues the drum ascends into tank 12. The vacuum is then interrupted and any filtrate which has not been drained is trapped within baffle 30 by ceiling arm 33 and prevented from escaping to rewet the filter cake.

It will be apparent from the foregoing description that the novel baffle means has many advantages in use. One advantage is that economical and simplified means are provided for retrofitting existing filters having a rewetting problem or for use with new filters without materially increasing the cost or manufacturing procedures therefor.

It is expressly understood that the present invention is not limited to embodiment illustrated and described. Various changes can be made in the design and arrangement of parts without departing from the spirit and scope of the invention as the same will now be understood by those skilled in the art.

What is claimed is:

1. In a rotary vacuum filter having a drum mounted for rotation in an ascending and descending path of rotation into and out of a tank containing a slurry solution, comprising
   (a) a plurality of spaced and parallel fixed vertical divider members extending longitudinally across the surface of said drum and supporting thereon a wire deck assembly,
   (b) a filter media located about the wire deck assembly and spaced from the outer surface of the drum by said divider members with each pair of adjacent divider members providing the side walls of a filtrate compartment for receiving filtrate from said filter media,
   (c) removable baffle means positioned within at least one of said filtrate compartments between a said pair of divider members beneath said wire deck assembly for containing filtrate therein during rotation of said drum in said descending path,
   (d) said baffle means comprising an elongated C-shaped insert member adapted for slidable insertion into a fixed position within a filtrate compartment from one end of said drum in a longitudinal direction parallel to the axis of rotation of said drum,
   (e) said C-shaped insert member having a pair of spaced arms and a bight portion connecting said arms,
   (f) said spaced arms of said insert member in the inserted fixed position of said member within a filtrate compartment providing the bottom and ceiling respectively of said compartment and wherein the bight portion of said insert member engages one of said divider members with said ceiling arm spaced from the other of said divider members to provide an opening to said filtrate compartment for filtrate passing through said filter media, and
   (g) spaced resilient detent tabs provided on said ceiling arm to engage said other divider wall of said filtrate compartment to detent said insert member in position therein.

* * * * *